United States Patent
Palanichamy et al.

(10) Patent No.: US 8,261,015 B2
(45) Date of Patent: Sep. 4, 2012

(54) UTILIZING MORE CAPACITY OF A PHYSICAL DISK THROUGH MULTIPLE LOGICAL DRIVES ON THE PHYSICAL DISK

(75) Inventors: Prakash Palanichamy, Mettupalayam (IN); Senthil Kannan, Pondicherry (IN); Satish Subramanian, Chennai (IN)

(73) Assignee: LSI Corporation, Milpitas, CA (US)

( * ) Notice: Subject to any disclaimer, the term of this patent is extended or adjusted under 35 U.S.C. 154(b) by 401 days.

(21) Appl. No.: 12/210,051

(22) Filed: Sep. 12, 2008

(65) Prior Publication Data

US 2010/0070702 A1 Mar. 18, 2010

(51) Int. Cl.
  *G06F 12/00* (2006.01)
(52) U.S. Cl. .............. 711/114; 711/170; 711/E12.001
(58) Field of Classification Search .................. 711/114, 711/E12.001, 170
See application file for complete search history.

(56) References Cited

U.S. PATENT DOCUMENTS

| | | | |
|---|---|---|---|
| 5,459,853 A * | 10/1995 | Best et al. | 711/114 |
| 6,408,319 B1 * | 6/2002 | Cambonie | 708/406 |
| 6,622,196 B1 * | 9/2003 | Mitani | 711/5 |
| 7,555,601 B2 * | 6/2009 | Yamagami | 711/114 |
| 7,617,227 B2 * | 11/2009 | Watanabe et al. | 1/1 |
| 7,747,799 B2 * | 6/2010 | Nakagawa et al. | 710/68 |
| 7,797,501 B2 * | 9/2010 | Cherian et al. | 711/162 |
| 2005/0002058 A1 * | 1/2005 | Hirabayashi | 358/1.15 |
| 2006/0212625 A1 * | 9/2006 | Nakagawa et al. | 710/68 |
| 2007/0079099 A1 * | 4/2007 | Eguchi | 711/170 |
| 2008/0162846 A1 * | 7/2008 | Kodama | 711/162 |
| 2008/0288678 A1 * | 11/2008 | Nakagawa et al. | 710/68 |
| 2009/0248980 A1 * | 10/2009 | Hashimoto et al. | 711/114 |
| 2010/0023688 A1 * | 1/2010 | Crowther et al. | 711/114 |

FOREIGN PATENT DOCUMENTS

JP 06214724 A * 8/1994

OTHER PUBLICATIONS

Patterson, David; Garth A. Gibson, Randy Katz (1988). "A Case for Redundant Arrays of Inexpensive Disks (RAID)". SIGMOD Conference: pp. 109-116. retrieved Dec. 31, 2006.
http://en.wikipedia.org/w/index.php?title=RAID&printable=yes; date retrieved Jun. 18, 2008.

* cited by examiner

*Primary Examiner* — Mardochee Chery
(74) *Attorney, Agent, or Firm* — Alexander J. Neudeck; Cochran Freund & Young LLC

(57) ABSTRACT

A first physical capacity of a first physical storage device is determined. A second physical capacity of a second physical storage device that has a physical capacity greater than the first physical capacity is determined. A storage space pool comprising at least a first logical drive, a second logical drive, and a third logical drive is created. The first logical drive corresponds to the first storage device and has the same capacity as the first physical capacity. The second logical drive corresponds to a first portion of the second storage device. The third logical drive corresponds to a second portion of the second storage device. The first portion and the second portion having at least the first physical capacity. Thus, two portions having at least the first physical capacity are utilized on the second physical drive instead of just one portion.

20 Claims, 3 Drawing Sheets

UTILIZING MORE CAPACITY OF A PHYSICAL DISK THROUGH MULTIPLE LOGICAL DRIVES ON THE PHYSICAL DISK

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of operating a redundant array of independent disks (RAID) storage system, comprising determining a first capacity of a first storage device; determining a second capacity of a second storage device that is greater than said first capacity; and, creating a storage space pool comprising at least a first logical drive, a second logical drive, and a third logical drive, said first logical drive corresponding to said first storage device, said second logical drive corresponding to a first portion of said second storage device, said third logical drive corresponding to a second portion of said second storage device, the first portion and the second portion having at least said first capacity.

An embodiment of the invention may therefore further comprise a redundant array of independent disks (RAID) storage system, comprising a first storage device having a first capacity; a second storage device having a second capacity that is greater than said first capacity; and, a storage space pool comprising at least a first logical drive, a second logical drive, and a third logical drive, said first logical drive corresponding to said first storage device, said second logical drive corresponding to a first portion of said second storage device, said third logical drive corresponding to a second portion of said second storage device, the first portion and the second portion having at least said first capacity.

An embodiment of the invention may therefore further comprise a computer readable medium having instructions stored thereon for operating a redundant array of independent disks (RAID) storage system that, when executed by a computer, at least direct the computer to determine a first capacity of a first storage device; determine a second capacity of a second storage device that is greater than said first capacity; and, create a storage space pool comprising at least a first logical drive, a second logical drive, and a third logical drive, said first logical drive corresponding to said first storage device, said second logical drive corresponding to a first portion of said second storage device, said third logical drive corresponding to a second portion of said second storage device, the first portion and the second portion having at least said first capacity.

DETAILED DESCRIPTION OF THE EMBODIMENTS

Figure 1:
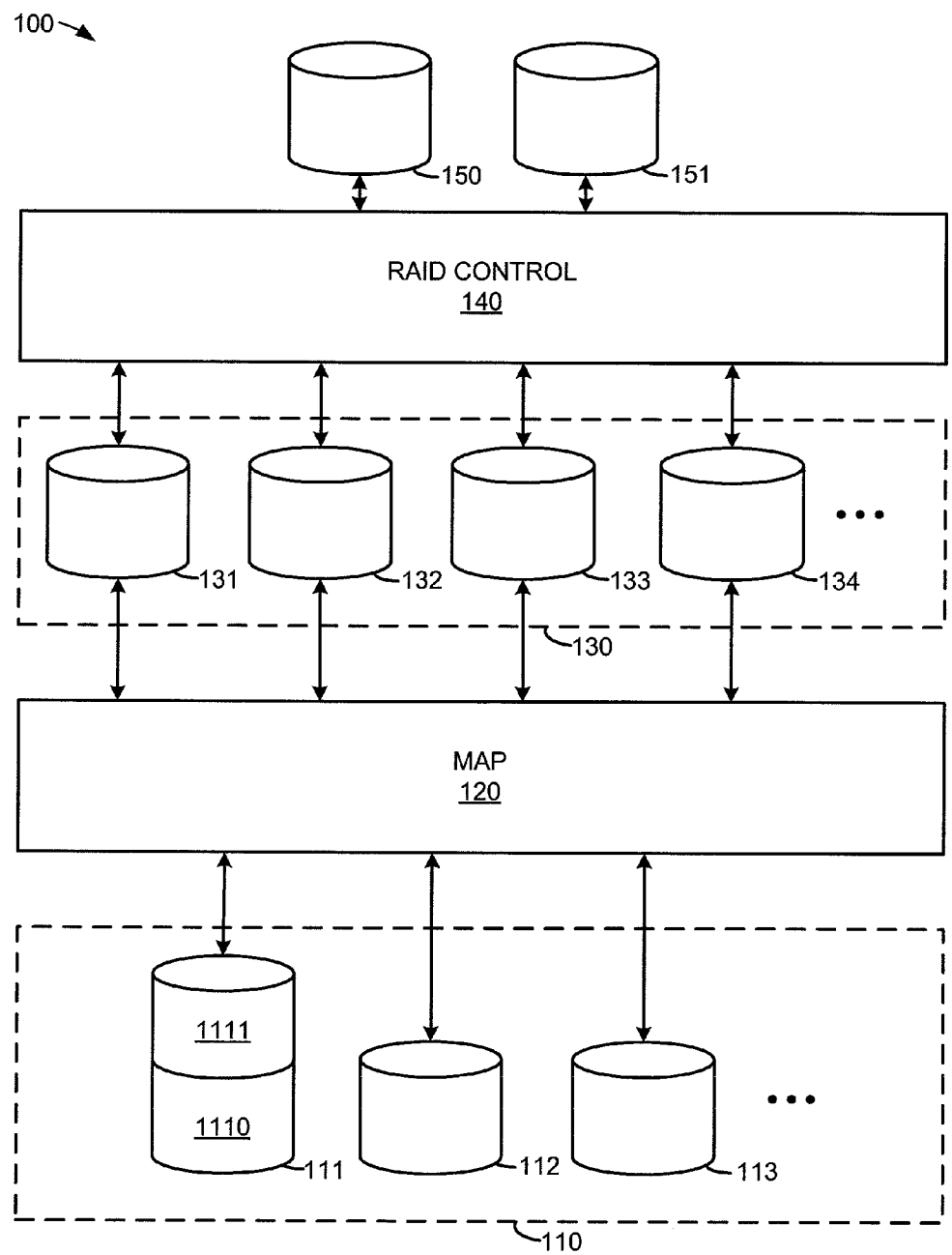
FIGS. 1 and 3 are block diagrams of a storage system that utilizes unused storage capacity.

FIG. 1 is a block diagram of a storage system that utilizes unused storage capacity. In FIG. 1, storage system 100 comprises physical drive group 110, map 120, storage pool 130, RAID control 140, virtual volume 150, and virtual volume 151. Physical drive group 110 includes physical drives 111-113. Logical drive group includes logical drives 131-134. Each of the drives in physical drive group 110 (e.g., physical drive 111-113) are operatively coupled to map 120. Map 120 is operatively coupled to each of the logical drives 131-134. Logical drives 131-134 are each operatively coupled to RAID control 140. RAID control 140 is operatively coupled to virtual volumes 150-151. Storage system 100 may also include a storage array controller that is not shown in FIG. 1.

In FIG. 1, physical drives 111-113 are typically separate physical storage devices such as hard disk drives. Map 120 and RAID control 140 are typically software modules or processes that run on a storage array controller. However, map 120 and/or RAID control 140 may be assisted by hardware accelerators. Storage pool 130, logical drives 131-133, and virtual volumes 150-151 are functional abstractions intended to convey how various software components (such as map 120 and RAID control 140) interact with each other, and hardware components (such as host computers). An example of a functional abstraction is a software application programming interface (API). Map 120 and RAID control 140 may be implemented on a computer. Instructions for implementing map 120 and RAID control 140 may be stored on a computer readable medium.

In an embodiment, storage system 100 identifies that physical drive 111 has a capacity that is at least twice the capacity of physical drives 112-113. Storage system 100 configures map 120 to logically divide physical drive 111 into at least a first portion 1110 and a second portion 1111. Thus, physical drive 111 includes a first portion 1110 and a second portion 1111.

In an embodiment, the capacity of the first portion 1110 is equal to the capacity of physical drives 112-113. In an embodiment, the capacity of the second portion 1111 is equal to the capacity of physical drives 112-113. In an embodiment, the capacity of physical drive 111 is greater than or equal to an integer multiple greater than two (2) of the capacity of physical drives 112-113. Thus, the capacity of the second portion 1111 may be greater than or equal to the capacity of physical drives 112-113. Likewise, the capacity of the first portion 1110 may be greater than or equal to the capacity of physical drives 112-113.

Map 120 may be or include a module, process, or hardware that creates storage pool 130 and projects logical drives 131-134 to RAID control 140. In an embodiment, map 120 creates storage pool 130 by projecting the first portion 1110, the second portion 1111, and physical drives 112-113 to RAID control 140 as logical drives 131-134. Logical drives 131-134 all are projected as having equal capacities. For example, map 120 may project first portion 1110 to RAID control 140 as logical drive 131. Logical drive 131 may be projected to RAID control 140 as having a capacity that is equal to the capacity of physical drives 112-113. Map 120 may project second portion 1111 to RAID control 140 as logical drive 132. Logical drive 132 may be projected to RAID control 140 as having a capacity that is equal to the capacity of physical drives 112-113. Physical drive 112 and physical drive 113 may be projected to RAID control 140 as logical drive 133 and logical drive 134, respectively. Logical drives 133-134 may be projected to RAID control 140 as having a capacity that is equal to the native capacity of physical drives 112-113. In an example, map 120 may utilize a reference table to determine a mapping from the first portion 1110 and the second portion 1111 to logical drive 131 and logical drive 132, respectively.

RAID control 140 may be or include a module, process, or hardware that creates various RAID levels utilizing logical drives 131-134 as created and projected by map 120. RAID control 140 may distribute storage data across logical drives 131-134 using RAID techniques to create virtual volumes 150-151. In an embodiment, RAID control 140 may create RAID levels 1 through 6 utilizing the logical drives 131-134 as created and projected by map 120.

RAID control 140 may project virtual volumes 150-151 to one or more hosts (not shown). RAID controller 140 may also project additional virtual volumes. However, these are omitted from FIG. 1 for the sake of brevity. Once created from the RAID configurations, virtual volumes 150-151 may be accessed by host computers. Virtual volumes 150-151 may each have different RAID levels. For example, virtual volume 150 may be configured as RAID level 1. Virtual volume 151 may be configured as RAID level 5.

In an embodiment, RAID controller 140 groups logical drives 131-134 into RAID groups. A RAID group may correspond to a virtual volume 150-151. In an example, RAID controller 140 may group logical drive 131 that corresponds to first portion 1110 with logical drive 133 that corresponds to physical drive 112. This RAID group may be projected to a host computer as virtual volume 150. In an embodiment, storage system 100 ensures that the same RAID group does not have more than one logical drive 131-134 from the same physical drive 111-112. In other words, storage system 100 ensures that the first portion 1110 and the second portion 1111 are not both used for the same RAID group.

In an embodiment, the first portion 1110 or the second portion 1111 may be configured by storage system 100 to cache data for storage system 100. In an embodiment, the first portion 1110 or the second portion 1111 may be configured by storage system 100 as a hot spare for storage system 100.

Storage system 100 may identify that physical drive 111 has a greater capacity than other physical drives 112-113 when physical drive 111 is placed in physical drive group 110 as a replacement. For example, when a physical drive fails, it needs to be replaced with another physical drive. When this happens the capacity of the failing drive may not be available due to a variety of reasons that include the failing drive capacity no longer being sold by the manufacturer. Thus, the failing drive may be replaced by a physical drive 111 that has a greater capacity than other physical drives 112-113 in storage system 100. Storage system 100 may be configured as describe previously to create new RAID volumes utilizing the unused extra capacity of physical drive 111. In addition, storage system 100 may be configured to utilize the extra unused capacity of physical drive 111 for file I/O caching or as a hot spare.

Figure 2:
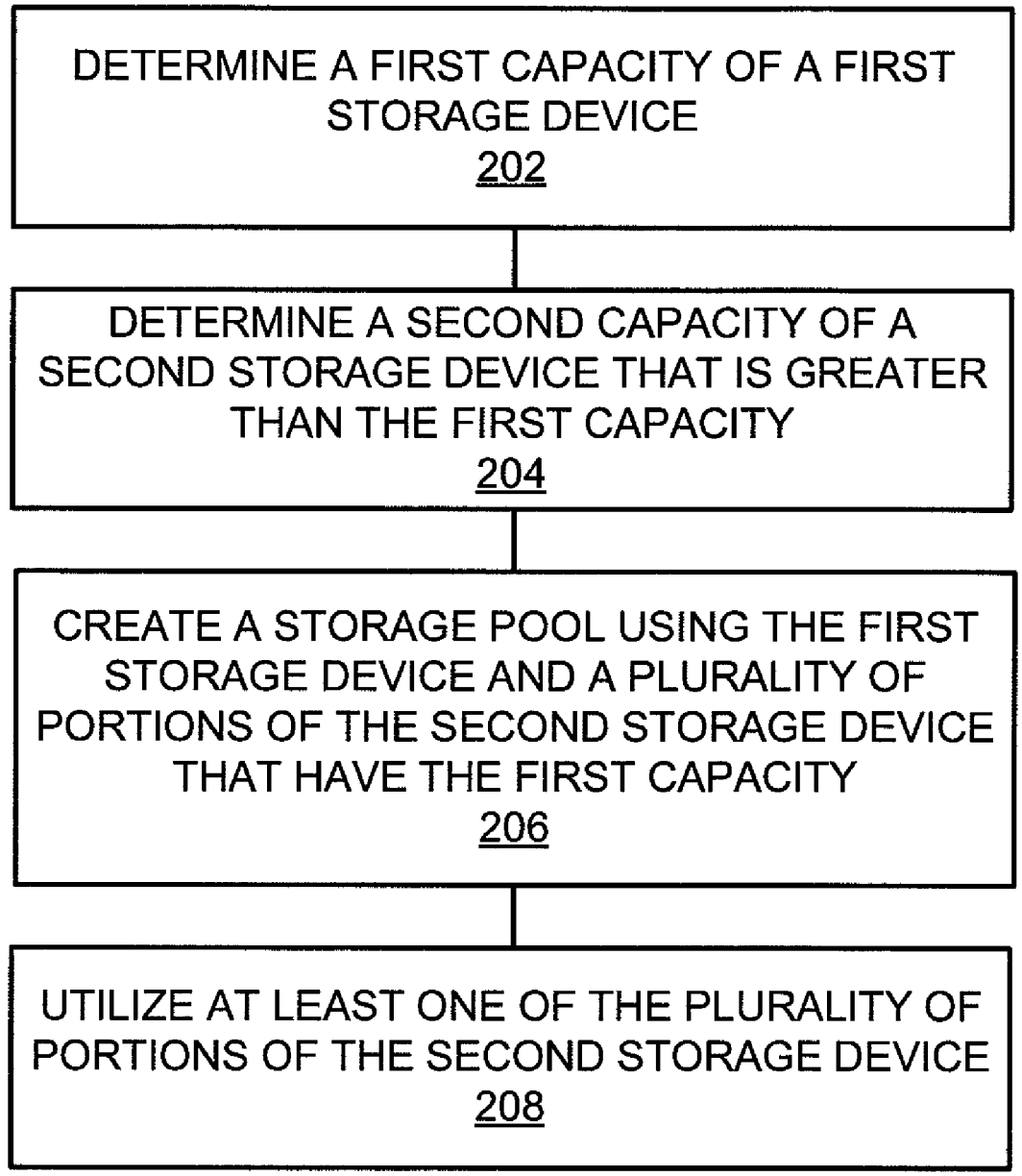
FIG. 2 is a flowchart of a method of utilizing unused capacity.
Figure 3:
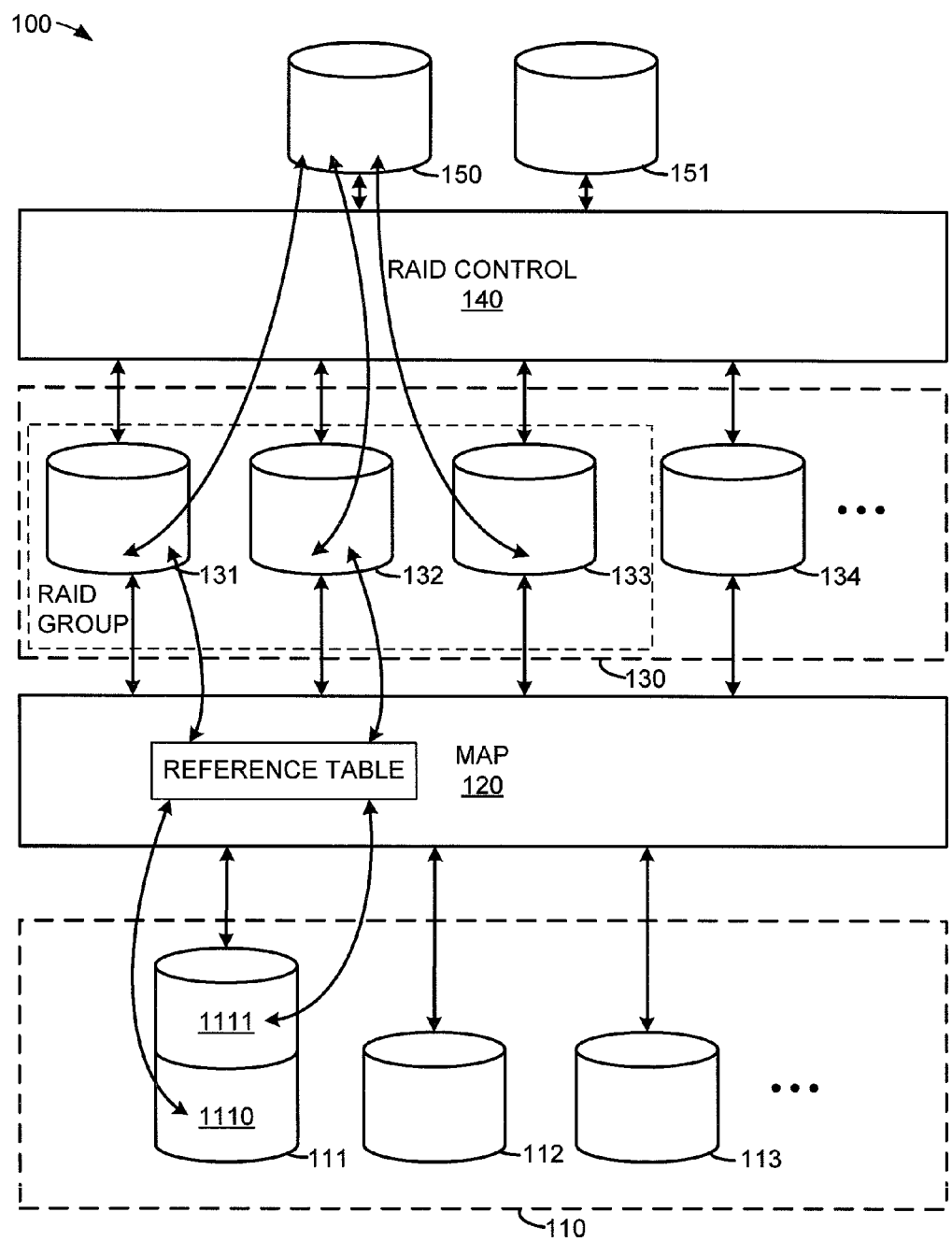

FIG. 2 is a flowchart of a method of utilizing unused capacity. The steps illustrated in FIG. 2 may be performed by one or more elements of storage system 100.

A first capacity of a first storage device is determined (202). For example, storage system 100 may determine the capacity of physical drive 112. A second capacity of a second storage device that is greater than the first capacity is determined (204). For example, storage system 100 may determine that the capacity of physical drive 111 is greater than the capacity of physical drive 112. Physical drive 111 may be a replacement for a physical drive that has failed.

A storage pool is created using the first storage device and a plurality of portions of the second storage device that have the first capacity (206). For example, storage system 100 may create storage pool 130 using at least physical drive 112, first portion 1110, and second portion 1111. At least one of the plurality of portions of the second storage device are utilized (208). For example, storage system 100 may utilize second portion 1111 as a logical drive 132 that is part of a RAID group. In another example, storage system 100 may utilize second portion 1111 as a logical drive 132 configured as hot spare. In another example, storage system 100 may utilize second portion 1111 as a logical drive 132 for file I/O caching.

In another example, storage system 100 may utilize second portion 1111 as a logical drive 132 that is part of a RAID group with storage data distributed across two or more logical drives 131-134 using RAID techniques to create virtual volumes 150-151. In another example, RAID control 140 may create RAID levels 1 through 6 utilizing second portion 1111 as one of the logical drives 131-134 as created and projected by map 120.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of operating a redundant array of independent disks (RAID) storage system comprised of a first physical storage device having a first physical storage capacity and a second physical storage device having a second physical storage capacity, comprising:

determining that the first physical storage capacity is the storage capacity of the first physical storage device;

determining that the second physical storage capacity is the storage capacity of the second physical storage device, the second physical storage capacity greater than or equal to an integer multiple greater than two (2) of the first physical storage capacity;

determining said second physical storage capacity is greater than said first physical storage capacity; and, creating a storage space pool comprising at least a first logical drive, a second logical drive, and a third logical drive, said first storage device utilized as said first logical drive, said first logical drive having a storage capacity equal to the first physical storage capacity, a first portion of said second storage device utilized as said second logical drive, a second portion of said second storage device utilized as said third logical drive, the first portion having at least said first physical storage capacity and the second portion having at least said first physical storage capacity.

2. The method of claim 1, further comprising:

distributing storage data across at least said first logical drive and said second logical drive using at least one RAID technique to create a virtual volume.

3. The method of claim 1, further comprising:

distributing storage data across at least said first logical drive and said third logical drive using at least one RAID technique to create a virtual volume.

4. The method of claim 1, further comprising:

grouping the first, second, and third logical drives into a first RAID group and a second RAID group, the first RAID group and the second RAID group wherein the second logical drive and the third logical drive are not allowed to be grouped together.

5. The method of claim 1, further comprising:

mapping said first portion of said second physical storage device to said second logical drive according to a reference table; and, mapping said second portion of said second physical storage device to said third logical drive according to said reference table.

6. The method of claim 1, wherein the third logical drive is configured to cache data for said RAID storage system.

7. The method of claim 1, wherein the third logical drive is configured as a hot spare storage device for said RAID storage system.

8. A redundant array of independent disks (RAID) storage system, comprising:

a first physical storage device having a first physical storage capacity;

a second physical storage device having a second physical storage capacity that is greater than said first physical storage capacity, the second physical storage capacity greater than or equal to an integer multiple greater than two (2) of the first physical storage capacity; and, a storage space pool comprising at least a first logical drive, a second logical drive, and a third logical drive, said first physical storage device utilized as said first logical drive, said first logical drive having a storage capacity equal to the first physical storage capacity, a first portion of said second physical storage device utilized as said second logical drive, a second portion of said second physical storage device utilized as said third logical drive, the first portion having at least said first physical storage capacity and the second portion having at least said first physical storage capacity.

9. The RAID storage system of claim 8, comprising:

a virtual volume comprising storage data distributed across at least said first logical drive and said second logical drive using at least one RAID technique.

10. The RAID storage system of claim 8, comprising:

a virtual volume comprising storage data distributed across at least said first logical drive and said third logical drive using at least one RAID technique.

11. The RAID storage system of claim 8, comprising:

a first RAID group and a second RAID group, comprising the first, second, and third logical drives wherein the second logical drive and the third logical drive are not grouped together.

12. The RAID storage system of claim 8, comprising:

a reference table that maps said first portion of said second physical storage device to said second logical drive and said second portion of said second physical storage device to said third logical drive.

13. The RAID storage system of claim 8, wherein the third logical drive is configured to cache data for said RAID storage system.

14. The RAID storage system of claim 8, wherein the third logical drive is configured as a hot spare storage device for said RAID storage system.

15. A computer readable medium having instructions stored thereon for operating a redundant array of independent disks (RAID) storage system comprised of a first physical storage device having a first physical storage capacity and a second physical storage device having a second physical storage capacity that, when executed by a computer, at least direct the computer to:

determine that the first physical storage capacity is the storage capacity of the first physical storage device;

determine that the second physical storage capacity is the storage capacity of the second physical storage device, the second physical storage capacity greater than or equal to an integer multiple greater than two (2) of the first physical storage capacity;

determine said second physical storage capacity greater than said first physical storage capacity; and, create a storage space pool comprising at least a first logical drive, a second logical drive, and a third logical drive, said first physical storage device to be utilized as said first logical drive, said first logical drive to have a storage capacity equal to said first physical storage capacity, a first portion of said second physical storage device to be utilized as said second logical drive, a second portion of said second physical storage device to be utilized as said third logical drive, the first portion having at least said first physical storage capacity and the second portion having at least said first physical storage capacity.

16. The computer readable medium of claim 15, wherein the computer is further directed to:

distribute storage data across at least said first logical drive and said second logical drive using at least one RAID technique to create a virtual volume.

17. The computer readable medium of claim 15, wherein the computer is further directed to:

distribute storage data across at least said first logical drive and said third logical drive using at least one RAID technique to create a virtual volume.

18. The computer readable medium of claim 15, wherein the computer is further directed to:

group the first, second, and third logical drives into a first RAID group and a second RAID group, the first RAID group and the second RAID group wherein the second logical drive and the third logical drive are not allowed to be grouped together.

19. The computer readable medium of claim 15, wherein the third logical drive is configured to cache data for said RAID storage system.

20. The computer readable medium of claim 15, wherein the third logical drive is configured as a hot spare storage device for said RAID storage system.

* * * * *